United States Patent
Hansen et al.

(10) Patent No.: US 9,446,468 B2
(45) Date of Patent: *Sep. 20, 2016

(54) SILENT ENTRY TORCHING AND OXYGEN DELIVERY SYSTEM AND CONFIGURATION

(71) Applicant: The Osen-Hunter Group, LLC, Barboursville, VA (US)

(72) Inventors: Mark A. Hansen, Virginia Beach, VA (US); Brennan E. Hansen, Chesapeake, VA (US)

(73) Assignee: THE OSEN-HUNTER GROUP, LLC, Barboursville, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/718,371

(22) Filed: May 21, 2015

(65) Prior Publication Data

US 2015/0251265 A1    Sep. 10, 2015

Related U.S. Application Data

(63) Continuation-in-part of application No. 13/779,950, filed on Feb. 28, 2013, now Pat. No. 9,056,362.

(60) Provisional application No. 61/604,750, filed on Feb. 29, 2012.

(51) Int. Cl.
| | |
|---|---|
| *B23K 7/00* | (2006.01) |
| *B23K 7/10* | (2006.01) |
| *B23K 35/02* | (2006.01) |
| *B23K 7/08* | (2006.01) |

(52) U.S. Cl.
CPC ............... *B23K 7/002* (2013.01); *B23K 7/08* (2013.01); *B23K 7/10* (2013.01); *B23K 35/0211* (2013.01); *B23K 35/0216* (2013.01)

(58) Field of Classification Search
CPC .............................. B23K 7/00; B23K 35/0211
USPC .......................................................... 266/48
See application file for complete search history.

(56) References Cited

U.S. PATENT DOCUMENTS

| | | |
|---|---|---|
| 3,591,758 A | 7/1971 | Clucas |
| 4,182,947 A | 1/1980 | Brower |
| 4,812,610 A | 3/1989 | Moore |
| 5,407,348 A | 4/1995 | Mims et al. |
| 5,888,447 A | 3/1999 | Smith et al. |

(Continued)

OTHER PUBLICATIONS

International Search Report and Written Opinion from PCT/US2013/028240 dated Jan. 3, 2014.

(Continued)

*Primary Examiner* — Scott Kastler
(74) *Attorney, Agent, or Firm* — Millen, White, Zelano & Branigan, P.C.; William Nixon (57) ABSTRACT

A system for performing exothermic operations or oxygen delivery uses a rod and handle configuration to create a flowpath of oxygen. The rod includes cables having stainless steel fibers that burn using the oxygen within a hollow center area. While burning, the rod cuts through material. A sheath covers the covers to contain the gases and prevent unraveling of the cables. The handle attaches to the rod and provides control of the flow of oxygen to the rod. A manifold fixing in place bottles of oxygen connects to the handle and can be fixed to provide different mixtures from different bottles. The rod is disconnected when needed to fix a mask thereto for delivering breathable oxygen to a patient.

17 Claims, 8 Drawing Sheets

(56) References Cited

U.S. PATENT DOCUMENTS

| | | |
|---|---|---|
| 7,647,927 B2 | 1/2010 | Teetzel et al. |
| 9,056,362 B2* | 6/2015 | Hansen .................... B23K 7/00 |
| 2015/0251265 A1* | 9/2015 | Hansen .............. B23K 35/0211 |
| | | 148/194 |

OTHER PUBLICATIONS

International Preliminary Report on Patentability from PCT/US2013/028240 dated Sep. 2, 2014.

Hiromu Izumida et al. "Development of High-tensile-strength Stainless Steel Wire" SEI Technical Review, (2005), No. 60, pp. 24-28.

* cited by examiner

SILENT ENTRY TORCHING AND OXYGEN DELIVERY SYSTEM AND CONFIGURATION

This application is a C-I-P of U.S. 13/779,950 filed on Feb. 28, 2013, now U.S. Pat. No. 9,056,362 which claims benefit of provisional application 61/604,750 filed on Feb. 29, 2012.

FIELD OF THE INVENTION

The present invention relates to a system and associated devices that use oxygen for torching operations or any oxygen delivery to a user. More particularly, the present invention relates to silent entry torching system and associated exothermic torch devices that incorporate an improved configuration to deliver the oxygen to a torch, user and the like.

DISCUSSION OF THE RELATED ART

Exothermic torches may be used by military, police, fire fighter and rescue personnel to remove metal barriers found in a variety of environments. For example, an exothermic torch may be used to remove or cut into a door that is locked in order to rescue someone injured inside the room. An exothermic torch produces extremely high temperatures using the device to then melt, burn or decimate the barrier. Use of such tools is expedient when other alternatives are infeasible or unavailable.

A torch uses oxygen to produce the thermal properties needed for exothermic cutting. Oxygen is supplied using an oxygen regulator and an oxygen hose attached to an oxygen cylinder. Conventional torch systems use a battery to ignite the cutting rod. These batteries usually need to supply a high amperage signal or a 12-volt/24-volt DC capability to ignite the torch, which may result in quicker breakdown on the cable.

Hoses suffering from overuse or damage may decrease the pressure needed for exothermic operations. Low pressure may cause the hose to burn from the inside and pose dangers to users. Further, a hose needs to remain unobstructed for proper use. Cables or rods that break down easily are not effective. Further, the delivery of oxygen needs to be continuous and kept at the appropriate pressure to prevent leaks and the like.

Conventional torching devices may use a magnesium core to fuel the burning of the rod. The magnesium core is hazardous to ship, and must be handled with caution. Special containers, instructions and the like accompany these devices. The ignition devices used also are inconvenient to ship and use. Conventional rods using magnesium materials ignite with pyrophoric igniters, which themselves may be hazardous materials. Because of the danger posed by these devices, a safety pin or other item is used to prevent ignition. The pin must be removed prior to use, which can be inconvenient. Further, the pin may come loose during shipping. If the pin is configured to be added before ignition, then this poses additional problems if the pin is missing.

Moreover, the magnesium core is sensitive to the environment, and degrades over time. The degradation produces dud cables or rods that will not ignite during torching operations. For example, if 1000 rods are shipped, then up to 25% of the rods end up as duds. The number of duds increases costs and possibly endangers personnel or others because the rods do not work.

SUMMARY OF THE INVENTION

A silent entry torching assembly provides a torching rod that burns quietly to cut through materials, debris, walls, and the like. Unlike a conventional torching assembly, a silent one may be used without undue noise or an increased potential for harm. The disclosed silent entry torching system may perform these actions with a reduced need for special materials or equipment. The disclosed system may fit into a backpack worn by the user. This feature is especially important for movement within confined areas, such as buildings. The silent entry torching system burns the torching rod to cut through materials.

The disclosed system includes a torching rod having a unique configuration along with a handle that provides the features to utilize the rod. The handle creates the flowpath of oxygen into the torching rod. The handle may be comprised of materials readily available for replacement. The handle also may detach from the torching rod when needed.

The system can perform exothermic or oxygen delivery operations. The torching rod may be removed from the handle, and a mask coupled thereto. Oxygen from the bottle or bottles fixed to a manifold flows to the handle and into the mask so that personnel may deliver clean, breathable oxygen within an unsafe environment. For example, the disclosed system may burn a rod to cut through a wall within a burning building. Once through the wall, the rod is removed and a mask coupled to the handle. The operator presses the handle to allow oxygen to flow to a victim of the fire. Thus, the need to carry two oxygen delivery systems is eliminated.

According to embodiments of the present invention, a torching rod for use in exothermic operations is disclosed. The torching rod includes a plurality of cables having stainless steel fibers configured to burn during an exothermic operation. The plurality of cables surrounds a hollow center portion within the torching rod. The torching rod also includes a flowpath formed by the hollow center portion for oxygen to burn the stainless steel fibers. The torching rod also includes a sheath to enclose the plurality of cables and the hollow center area.

A handle device for use with a torching rod system in exothermic operations also is disclosed. The handle device includes a handle body having an inlet and an outlet. The inlet receives a flow of oxygen. The outlet couples with the torching rod to create a flowpath of oxygen into the torching rod. The handle device also includes a valve to set the flow of oxygen to the outlet to a specific pressure. The handle device also includes a handle cover adjacent to the inlet. The handle device also includes a flashback arrestor to couple with the inlet and integrated into the handle.

A torching system for exothermic operations also is disclosed. The torching system includes a rod. The rod includes a plurality of cables having stainless steel fibers configured to burn during an exothermic operation. The plurality of cables surrounds a hollow center area within the rod. The rod also includes a flowpath formed by the hollow center portion for oxygen to burn the stainless steel fibers. The rod also includes a sheath to enclose the plurality of cables and the hollow center portion. The torching system also includes a handle device to connect to the rod. The handle device includes a handle body having an inlet and an outlet. The inlet of the handle devices receives a flow of oxygen. The outlet of the handle device couples with the rod to create the flowpath of oxygen into the rod. The handle device includes a valve to adjust the flow of oxygen to the outlet. The inlet is configured at about a 90 degree angle from the rod. The torching system also includes a bottle containing oxygen to generate the flowpath of oxygen to the handle device.

A method for performing exothermic operations is disclosed. The method includes creating a flowpath of oxygen within a rod. The flowpath is surrounded by a plurality of cables having stainless steel fibers. The method also includes igniting the oxygen within the flowpath. The method also includes burning the stainless steel fibers.

BRIEF DESCRIPTION OF THE DRAWINGS

The accompanying drawings, which are included to provide further understanding of the invention and are incorporated in and constitute a part of this specification, illustrate embodiments of the present invention and together with the below description, serve to explain the principles of the invention.

DESCRIPTION OF THE DISCLOSED EMBODIMENTS

Reference will now be made in detail to the embodiments of the present invention, as illustrated in the drawings. Alternate embodiments of the present invention and their equivalents are shown without parting from the spirit or scope disclosed herein. It should be noted that, where applicable, like elements disclosed below are indicated by like reference numerals.

The present invention includes a cable or rod assembly for use as an oxygen supply system for exothermic torches and devices. Preferably, the disclosed assembly is a long flexible cable or rod that provides oxygen with sufficient pressure and without obstruction. While oxygen is flowing through the cable, it may be ignited using a much lower voltage or amperage than known exothermic torches. For example, a 9 volt battery may be used for ignition. A consumable electrode of stainless steel fibers provides the fuel for the torching, or exothermic, operations.

Figure 1:
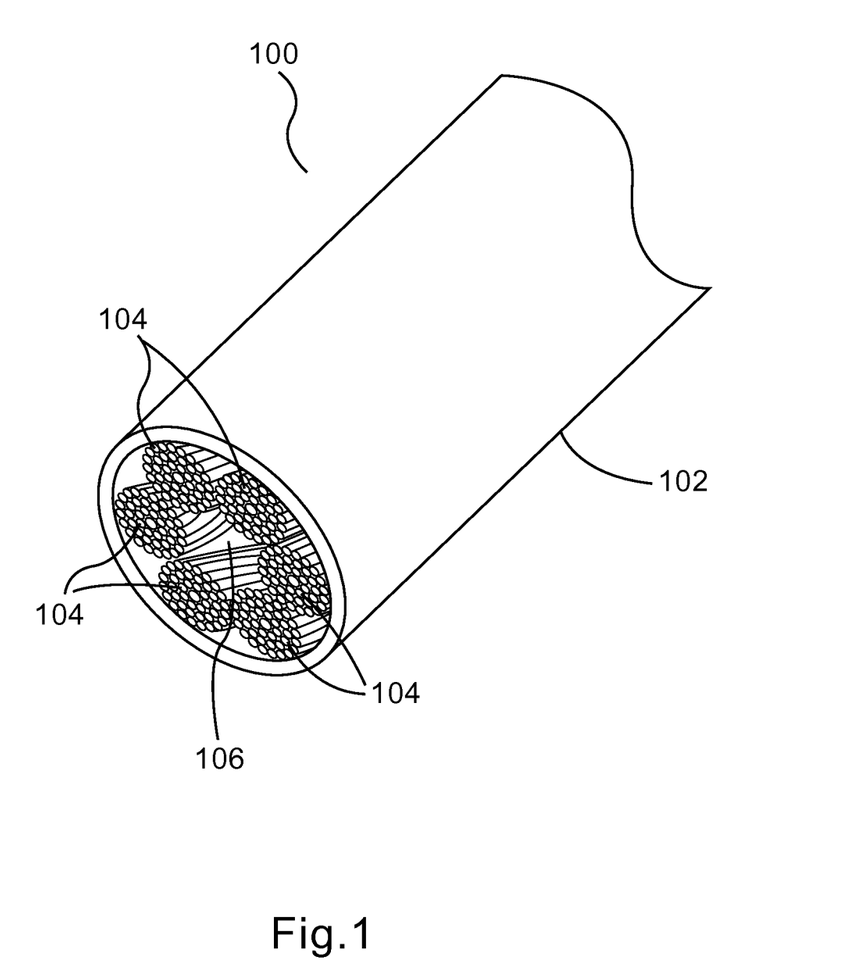
FIG. 1 illustrates a front view of a torching rod having a plurality of cables according to the disclosed embodiments.

FIG. 1 depicts a front view of a torching rod 100 having a plurality of cables 102 according to the disclosed embodiments. Torching rod 100 also may be known as a cable. Rod may be used to denote a rigid embodiment while cable may be used to denote a flexible embodiment. Torching rod 100 includes a multi-strand configuration that provides better performance than conventional metal rods.

Torching rod 100 includes a sheath 102 that provides the outer covering of the rod. Sheath 102 serves to keep the components and air within rod 100 from unraveling or escaping. Sheath 102 shown in FIG. 1 is a flexible sheath made of plastic material that allows torching rod 100 to bend or be shaped.

Torching rod 100 also includes a plurality of cables 104. Cables 104 may form a circular pattern, as shown in FIG. 1.

A hollow center portion forms a flowpath 106 for oxygen within torching rod 100. The oxygen flows through rod 100 without blockage. This feature may be especially important if rod 100 is bent or shaped. Conventional rods may not have a hollow center portion, which can be blocked during exothermic operation to cause harm to a user. Flowpath 106 delivers oxygen under most conditions.

The pressure of the oxygen flowing through torching rod 100 may be set to a range from 70 pounds per square inch (psi) to 130 psi. Thus, flowpath 106 may be a pressurized flowpath. More preferably, the range for oxygen pressure may be 90 psi to 100 psi. This range increases cutting performance of torching rod 100 so that it burns faster. Pressures within this range give the highest performance for the length of cut compared to the volume of oxygen consumed. This precise setting results in at least a 20% increase of cutting performance.

Figure 2:
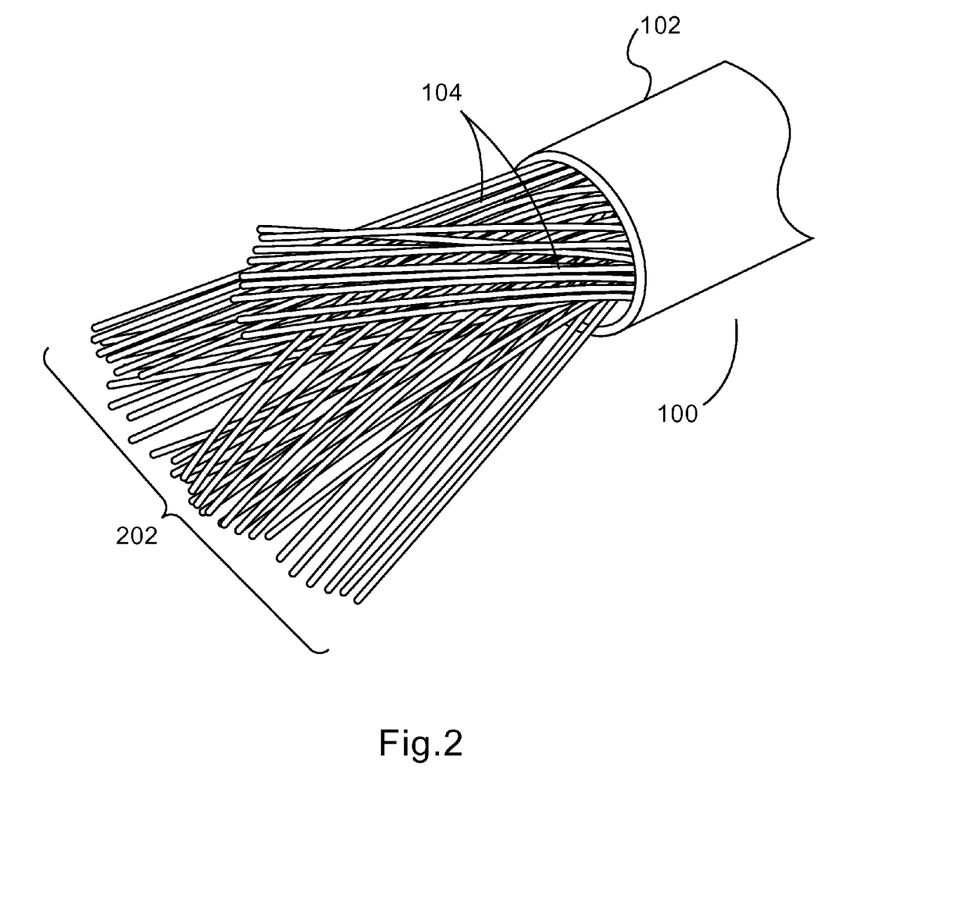
FIG. 2 illustrates the stainless steel fibers comprising the plurality of cables according to the disclosed embodiments.

FIG. 2 depicts another view of torching rod 100 with stainless steel fibers 202 comprising plurality of cables 104 according to the disclosed embodiments. Stainless steel fibers 202 comprise the multi-strand configuration. The fibers encircle with each other to form each cable 104. Fibers 202 may be comprised of high tensile wires that provide superior flexibility over conventional metal rods. Further, the stainless steel of fibers 202 burns in a safer manner than conventional magnesium rods. Stainless steel fibers 202 may be transported without the need for hazardous alerts or containers, and do not degrade over time. Thus, transportation costs may be lowered using torching rod 100.

Embodiments of the disclosed invention include a special blend of stainless steel fibers 202 that promote burning during exothermic operations. The oxygen within flowpath 106 may burn, or oxidize, fibers 202 at a pressure between 70 psi and 130 psi. Upon completion of exothermic burning, torching rod 100 may be set aside for future use. Nothing flammable is present when the oxygen flow stops as stainless steel is not combustible on its own. Stainless steel also will not contaminate its surrounding environment. The stainless steel may be handled safely shortly after completion of the burning process.

As shown in FIG. 2, plurality of cables 104 may encircle each other to weave in a pattern. The disclosed weave may interlace the cables together for a snug or tight fit but allow for the burning to be promoted as the torching rod melts. This pattern also promotes burning of fibers 202 and prevents unraveling. Long, straight magnesium cable rods do not provide this feature. Moreover, plurality of cables 104 may be coated with an ultraviolet inhibitor or stable jacketing. This feature further protects fibers 202 from deterioration or harm from environmental factors, such as sunlight or rain.

Torching rod 100 shown in FIG. 2 also includes a rigid or metallic sheath 102. Sheath 102 may be rigid when desired, especially when poked through holes for burning away walls or debris. In any embodiment, sheath 102 may burn away as cables 104 cut through materials.

Figure 3:
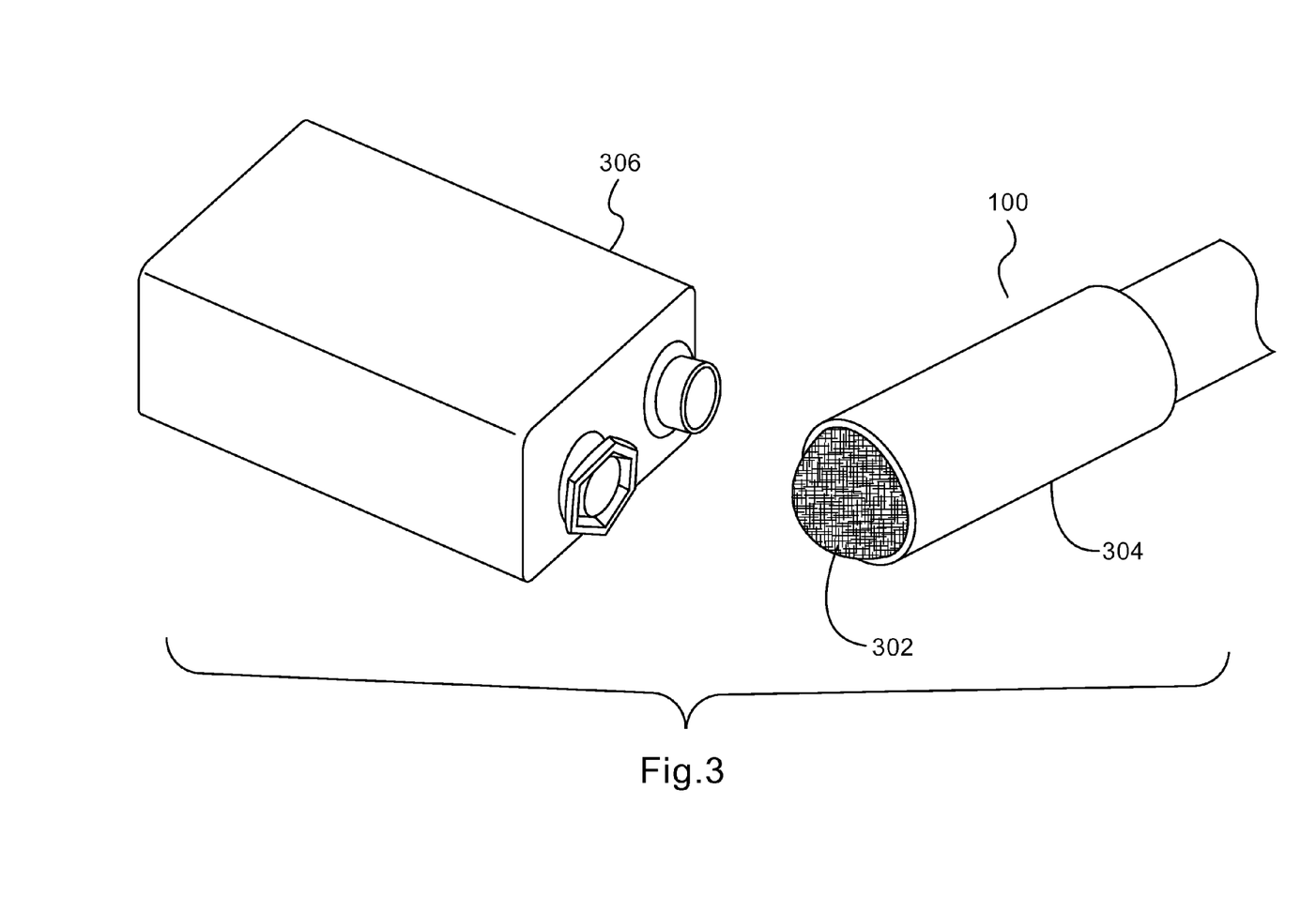
FIG. 3 illustrates an ignition source for the torching rod according to the disclosed embodiments.

FIG. 3 depicts an ignition source for torching rod 100 according to the disclosed embodiments. FIG. 3 shows an end of rod 100 that is directed away from the oxygen delivery source and ignited to commence burning operations. The ignition source includes steel wool 302. Steel wool 302, like fibers 202, may be transported without the need for special packaging or hazardous containers. Steel wool 302 may be placed in tip cover 304, which encloses a tip of rod 100. Other materials also may be used to ignite the oxygen, and the disclosed embodiments are not limited to steel wool. A part of tip cover 304 may be removed to expose the material for igniting rod 100.

Battery 306 is placed against steel wool 302 to ignite the oxygen within flowpath 106. Preferably, battery 306 is a 9 volt battery, but other batteries and ignition sources may be used. The ignition is performed using the electric arc created by the terminals of battery 306. Battery 306 is preferred over other ignition mechanisms, such as open flames, as it will not ignite the oxygen if it flows out of rod 100. This prevents accidents. Moreover, it also can be transported conveniently and without the need for hazardous containers or pyrophoric igniters. Battery 306 is small and can be used quickly without the need for removal or insertion of safety pins or other fail-safe devices. In this embodiment, a 9 volt battery may sit for a long time without serious degradation.

Figure 4:
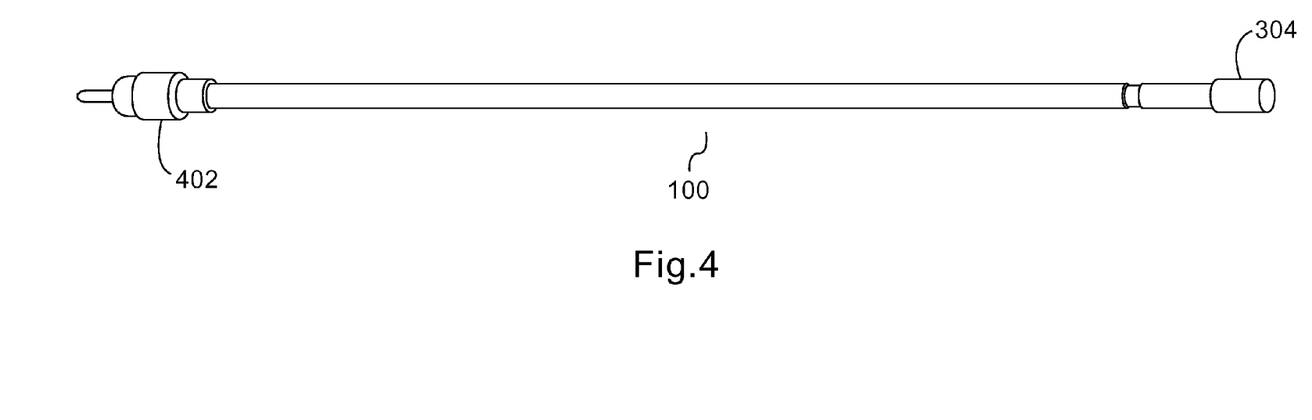
FIG. 4 illustrates a side view of a torching rod according to the disclosed embodiments.

FIG. 4 depicts a side view of rod 100 according to the disclosed embodiments. FIG. 4 also shows tip cover 304 as well as connector 402. Connector 402 may couple or connect rod 100 to a handle that delivers the oxygen to flowpath 106, disclosed in greater detail below. Connector 402 is detachable from the handle, and configured as a threaded fitting.

Rod 100 may have any length, such as 2, 4, 6 or 8 feet. Further, the width and diameter of rod 100 may be any size. Preferably, a flexible cable may have a diameter of 6 millimeters to 12 millimeters while a rigid rod may have a diameter of ¼ inch to ⅜ inch.

The disclosed rod configuration may be used in a torch assembly or oxygen delivery system, as disclosed in greater detail below. A regulated and pressurized oxygen flow is maintained and fed through torch rod 100. Once activated, the flames consume the oxygen and part of the rod. An operator then may use torch rod 100 to cut or pierce a material.

Torch rod 100 may be held at a 90 degree angle from the hand of the operator to provide a pierce point for the material being cut. Torch rod 100 provides a cutting tool in which oxygen flow may be regulated as desired. For cutting or burning, the disclosed rod is placed against the material at an angle, and moved in the direction of the intended cut. Oxygen is delivered via the disclosed system and handle. Alternatively, torch rod 100 may be placed against the material for gouging. The flexibility and increased capabilities of the disclosed configuration, especially the hollow center and stainless steel fibers, allow these functions to be performed more efficiently with less likelihood of breakage or disruption.

Figure 5:
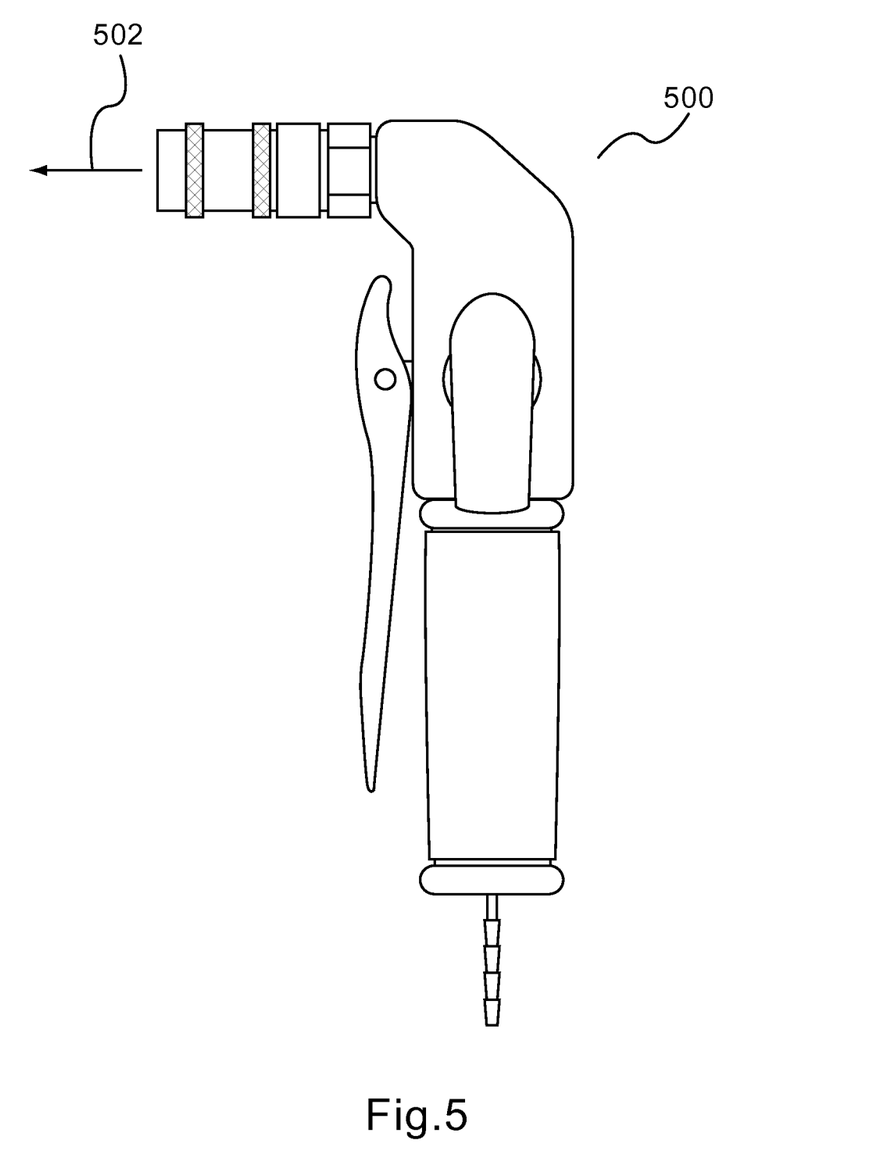
FIG. 5 illustrates a handle device for an oxygen delivery/torching rod system according to the disclosed embodiments.
Figure 6:
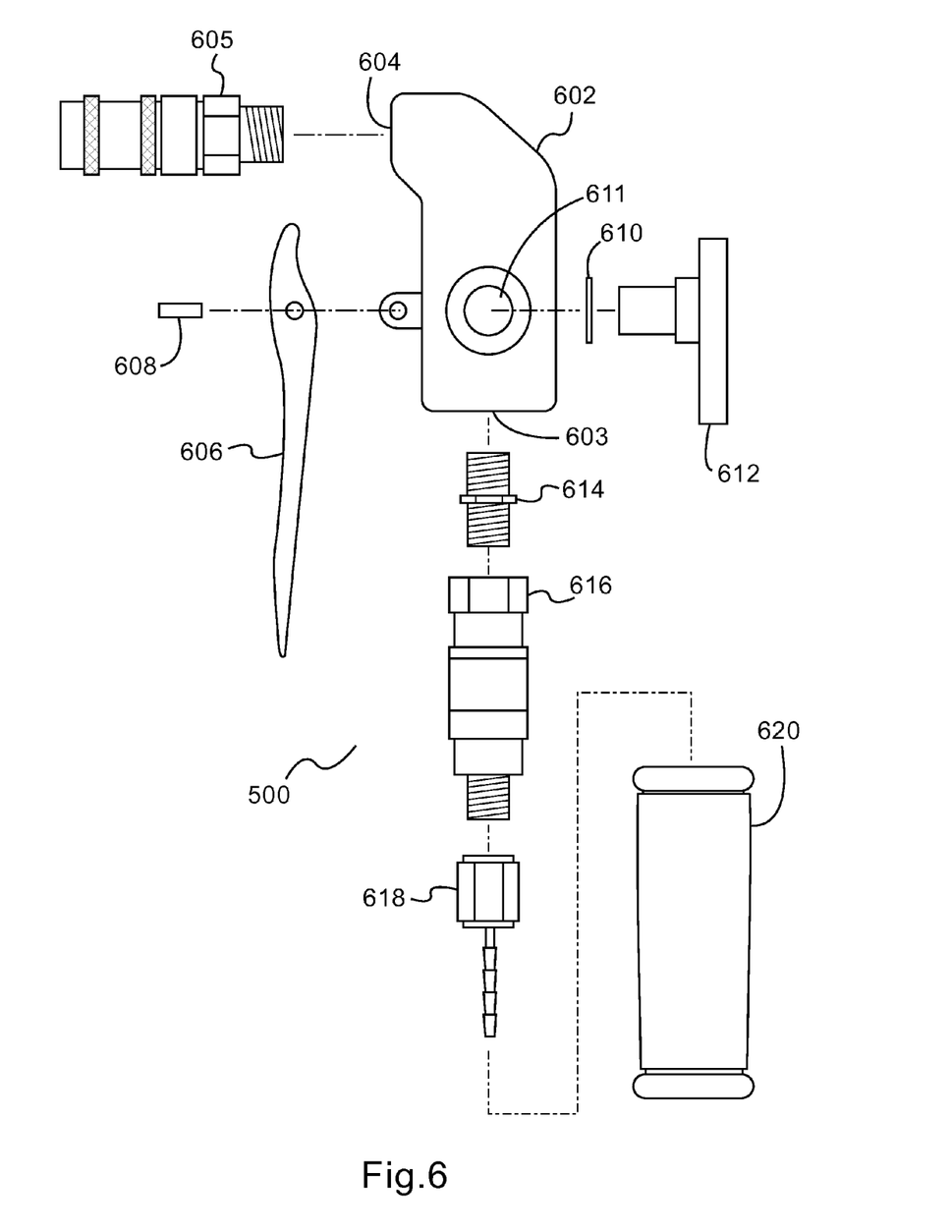
FIG. 6 illustrates a disassembled handle device according to the disclosed embodiments.

FIG. 5 depicts a handle 500 for an oxygen delivery/torching rod system according to the disclosed embodiments. FIG. 6 depicts a disassembled handle 500 according to the disclosed embodiments. Handle 500 also may be known as a handle device. Handle 500 receives torching rod 100 and provides oxygen flow 502 to flowpath 106 to enable exothermic operations. Handle 500 also stops oxygen flow 502 to stop exothermic operations. Handle 500 performs these actions with better reliability and efficiency than conventional handles. Handle 500 also enables torching rod 100 to have a flowpath 106 with oxygen flowing freely and without disruption. In other words, a stream of oxygen is delivered when needed, and cut off when not.

Handle 500 includes handle body 602. Handle body 602 includes an inlet 603 and an outlet 604. Inlet 603 introduces the oxygen flow into handle body 602 while outlet 604 expels it to torching rod 100. Preferably, outlet 604 is configured to be perpendicular to an axis for inlet 603. In other words, there is a 90 degree angle change in the flow of oxygen from inlet 603 out to torching rod 100. This configuration is more convenient and useable, and allow for positioning of torching rod 100. Handle body 602 may be comprised of brass, or other suitable metal.

Handle 500 connects handle body 602 to torching rod 100 using compact hose 605. Compact hose 605 fits into inlet 604, preferably using a threaded configuration. Compact hose 605 includes a spring-loaded mechanism to release torching rod 100 quickly. An operator may pull back a portion of compact hose 605 when rod 100 burns down far enough or needs replacing without having to grab or press anything. Further, this action may be accomplished using one hand.

Torch handle 606 connects to handle body 602 using pin 608. When pressed into handle 500, torch handle 606 allows oxygen to flow through handle body 602. Pin 608 blocks the flow of oxygen while torch handle 606 is not pressed. This configuration allows an operator to commence oxygen flow with one hand and stop it simply by releasing pressure on torch handle 606.

Valve 612 is coupled to handle body 602 to set the oxygen flow at the prescribed pressure. Preferably, valve 612 is a quarter-turn valve that is placed into aperture 611. Aperture 611 may be a hole that extends to the other side of handle body 602. Valve 612, therefore, may extend through the width of handle body 602. O-ring 610 engages valve 612 against handle body 602. Using this configuration, valve 612 may be placed on either side of handle body 602, thereby allowing right and left-handed adjustment of oxygen flow. Handle 500 can be used with either hand. An operator may turn valve 612 as needed to turn on and off the flow of oxygen. A pin may be used to keep valve 612 in place.

Flashback arrestor 616 is coupled to inlet 603 with pipe 614. Pipe 614 may be threaded to receive both parts and includes a hollow portion to allow the flow of oxygen into inlet 603. Flashback arrestor 616 is used to prevent a flame or other dangerous condition from moving out of handle 500 to a bottle of oxygen connected thereto. Thus, if rod 100 burns down and the flame consuming it reaches handle 500, then flashback arrestor 616 shuts off oxygen flow to prevent the bottle from exploding, thereby injuring the operator.

Handle 500 also includes hose barb adapter 618 coupled to flashback arrestor 616. Adapter 618 may be coupled to a hose or tube from the bottles within the oxygen delivery/torching system, disclosed in greater detail below. Handle cover 620 encloses these lower parts of handle 500. Preferably, handle cover 620 is comprised of rubber and covers flashback arrestor 616. Handle cover 620 hides these parts and protects them from damage. An exposed flashback arrestor 616 may be subject to damage or environmental factors, and handle cover 620 helps prevent that. Further, the operator can hold the entire assembly comfortably and with an increased range of motion.

Thus, when torching rod 100 is attached to compact hose 605, handle 500 may be engaged to deliver oxygen flow to rod 100. As rod 100 burns, oxygen flow may be turned on and off using valve 612 while torch handle 606 is pressed. A release of torch handle 606 stops the flow of oxygen to rod 100. Handle 500 places torching rod 100 at a 90 degree angle from the source of oxygen, and does not require special fittings or parts. In fact, handle 500 may replace faulty parts with standard parts. Handle 500 also fits conveniently in the palm of an operator.

Figure 7:
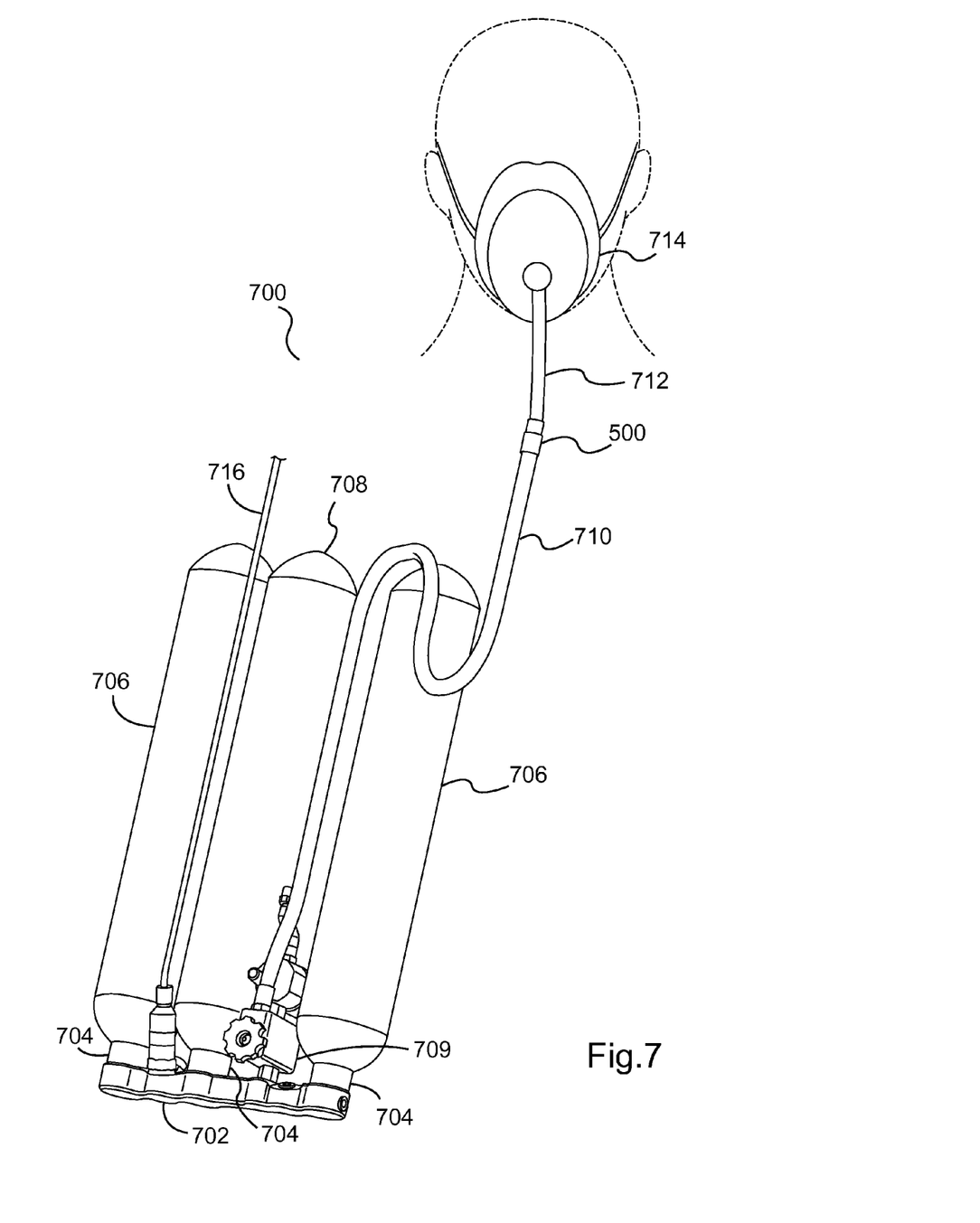
FIG. 7 illustrates an oxygen delivery/torching rod system according to the disclosed embodiments.

Handle 500 and torching rod 100 may be used in an overall oxygen delivery or torching system. The other parts may store the oxygen or other materials used by these features. FIG. 7 depicts an oxygen delivery/torching rod system 700 according to the disclosed embodiments. System 700 is a lightweight, compact oxygen delivery system that is worn by an operator and used in emergency or tactical situations to perform exothermic operations or deliver oxygen to personnel. System 700 may fit in a backpack or similar carrying bag, and may be taken off or out as needed. System 700 also uses an interchangeable configuration to allow an operator to change bottles or gases as needed.

System 700 includes torching rod 100 and handle 500, as disclosed above. System 700 also includes manifold 702. Manifold 702 is comprised of lightweight metallic material or plastic that is, preferably, worn on the back of the operator. Manifold 702 includes connectors 704 that accept bottles. The oxygen flows from the bottles into tube 710 to handle 500. As shown, system 700 includes oxygen bottles 706. Bottles 706 may be exchanged as desired by removing them from connectors 704. In one embodiment, bottles 706 include oxygen specially blended for exothermic operations.

Bottle 708, however, may be a bottle of breathable oxygen. Selector 709 may switch flow from one of bottles 706 to bottle 708 when one provides air to a patient. The breathable oxygen may be blended differently than the oxygen in bottles 706. The operator adjusts selector 709 as needed. System 700 also includes tube 712 and breathing mask 714 that may attach to handle 500 much like rod 100. Once attached, the operator may place mask 714 around a patient to provide air in smoke-filled rooms or other dangerous situations. Alternatively, handle 500 may be removed and mask 714 coupled directly to bottle 708.

Thus, once assembled, system 700 provides a steady flow of oxygen from bottle 708 through tube 710 to handle 500. Handle 500 is used to control the flow of oxygen into a rod 100 or mask 714, as needed. Both of these features may be switched out without the need for special equipment or lengthy conversion steps. Moreover, an operator can do so quickly and without the need for additional personnel.

Other gases may be attached to manifold 702, but the disclosed embodiments prefer to keep the bottles to mixtures of oxygen so as to not contaminate the flow of oxygen to handle 500.

Thus, system 700 provides unique and compact options for tactical breaching or rescue operations. In exothermic cutting torch operations, the disclosed embodiments provide operators with the option of using either a rigid rod-style cutting torch or a flexible cable-style cutting torch. The configuration of the plurality of cables with the rod provides increased cutting capability. A switch between cutting options is accomplished easily with user-friendly disconnect features. Further, mask 714 may be incorporated to provide breathable air using the disconnect features.

System 700 comes complete with an electrical ignition option, disclosed above, for either the rigid or flexible configuration. For example, a 9 volt battery may be used to ignite the cutting rod. System 700 may be enclosed securely and protected with a padded tactical pack unit. System 700 also may be expanded, as disclosed above, to include a respiratory protection (SCBA) option to enhance the substantial breaching and rescue tool capabilities. These feature combine to make the disclosed system a smaller, lighter and more versatile tactical torch breaching and rescue system over conventional systems. System 700 may have a weight of about 23 lbs, when fully loaded with both torch options and ignition systems. Dimensions preferably are a length of 20 inches, a width of 13 inches and depth of 4 inches. These dimensions make it reasonable for the average adult to carry system 700. Other dimensions and weights may be used depending on the capacity and need for the system.

Figure 8:
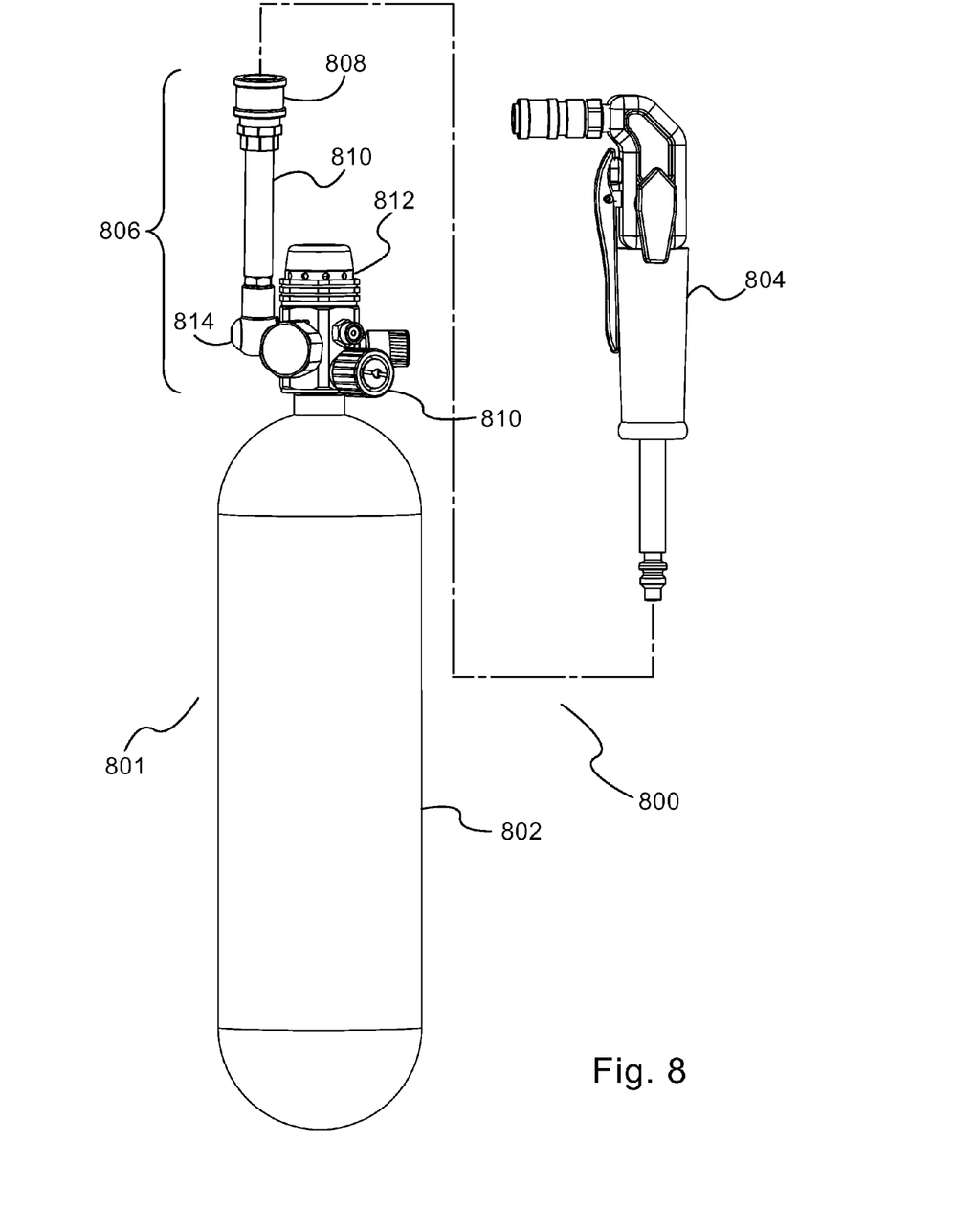
FIG. 8 illustrates another embodiment of the oxygen delivery/torching rod system according to the disclosed embodiments.

FIG. 8 depicts another embodiment of the oxygen delivery/torching rod system according to the disclosed embodiments. System 800 includes a single bottle 801, as opposed to the plurality of bottles shown in FIG. 7. Bottle 801 also may be filled with oxygen that is delivered to a rod through handle 804. System 800, however, may deliver oxygen pressurized to a certain value, such as between 80 psi and 120 psi. These pressure settings help improve cutting efficiency, as disclosed above.

Handle 804 may connect to bottle 801 using quick disconnect fitting 808 and tube 810. Tube 810 may be flexible or any length to accommodate handle 804. Tube 810 attaches to regulator 812 using fitting 814. Thus, oxygen may flow through tube 810 from bottle 801.

Cylinder 802 of bottle 801 houses the oxygen. Regulator 812 is located at the top of cylinder 802. Regulator 812 includes knob 810 to adjust the pressure of the oxygen leaving cylinder 802. Regulator 812 may set the pressure for the oxygen used in flowpath 106. The user may turn knob 810 to adjust pressure of the oxygen, or, alternatively, regulator 812 may be set to a specific pressure of the oxygen. As noted above, the specific pressure may be set to optimize burning of the rod.

The embodiment shown in FIG. 8 is smaller and lighter than the embodiment shown in FIG. 7. Further, the single bottle configuration may be more convenient to carry and use. Preferably, the weight of the single bottle embodiment may be below 18 pounds. The single bottle configuration may include a manifold or other apparatus to attach additional bottles to the single bottle.

Using the single bottle configuration, bulky equipment is reduced and system 800 is easier to manufacture. Further, regulation of the oxygen pressure coming from bottle 801 may be set and monitored. Regulator 812 may set the pressure to a specific value to optimize burning operations using a rod attached to handle 804.

It will be apparent to those skilled in the art that various modifications can be made in the disclosed system, handle and rod without departing from the spirit or scope of the invention. Thus, it is intended that the present invention cover these modifications of the embodiments disclosed above and shown in the Figures provided that the modifications come within the scope of the claims and their equivalents.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding U.S. Application No. 61/604,750, filed Feb. 29, 2012, and U.S. application Ser. No. 13/779,950, filed Feb. 28, 2013 are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A torching rod for use in exothermic operations, the rod comprising:
   a plurality of cables having stainless steel fibers configured to burn during an exothermic operation, wherein the plurality of cables surrounds a hollow center portion within the torching rod;
   a flowpath formed by the hollow center portion for oxygen to burn the stainless steel fibers, wherein the oxygen is pressurized from about 80 psi to 120 psi; and
   a sheath to enclose the plurality of cables and the hollow center portion.

2. The torching rod of claim 1, wherein the sheath includes a flexible sheath to enclose the plurality of cables.

3. The torching rod of claim 1, wherein the sheath includes a rigid tube to enclose the plurality of cables.

4. The torching rod of claim 1, further comprising an ignition source to ignite the oxygen within the flowpath.

5. The torching rod of claim 4, wherein the ignition source comprises a portion of steel wool.

6. The torching rod of claim 4, wherein the ignition source includes a battery.

7. The torching rod of claim 1, wherein the plurality of cables includes an ultraviolet stable jacketing.

8. A torching system for exothermic operations comprising:
   a rod including
      a plurality of cables having stainless steel fibers configured to burn during an exothermic operation, wherein the plurality of cables surrounds a hollow center portion within the rod,
      a pressurized flowpath formed by the hollow center portion for oxygen to burn the stainless steel fibers,
      a sheath to enclose the plurality of cables and the hollow center portion; and
   a handle device to connect to the rod, the handle device including
      a handle body having an inlet and an outlet,
      the inlet to receive a flow of oxygen,
      the outlet to couple with the rod to create the flowpath of oxygen into the rod, and
      a valve to adjust the flow of oxygen to the outlet,
      wherein the inlet is configured at about a 90 degree angle from the rod;
   a bottle containing oxygen to generate the pressurized flowpath of oxygen to the handle device; and
   a regulator coupled to the bottle to regulate the pressurized flowpath.

9. The torching system of claim 8, wherein the bottle is detachable from the handle body.

10. The torching system of claim 8, wherein the handle device includes a handle adjacent to the inlet to receive the flow of oxygen from one of the plurality of bottles.

11. The torching system of claim 10, further comprising a flashback arrestor to couple with the inlet and integrated into the handle.

12. The torching system of claim 8, wherein the manifold has a weight between 18 and 26 lbs.

13. The torching system of claim 8, wherein the sheath comprises rigid material.

14. The torching system of claim 8, wherein the sheath comprises flexible material.

15. The torching system of claim 8, further comprising a mask and a tube to connect the mask to the flowpath to deliver breathable oxygen from the bottle.

16. A method for performing exothermic operations, the method comprising:
   pressurizing a flowpath of oxygen in a range of about 80 psi to 120 psi;
   creating the flowpath of oxygen within a tube rod, wherein the flowpath is surrounded by a plurality of cables having stainless steel fibers;
   igniting the oxygen within the flowpath; and
   burning the stainless steel fibers.

17. The method of claim 16, further comprising cutting a material using the stainless steel fibers by
   placing tube rod against the material, and
   moving the tube rod in a direction of an intended cut.

* * * * *